May 9, 1933. W. R. RUTHERFORD 1,908,450
AUTOMOBILE HAT AND PARCEL RACK
Filed Oct. 24, 1931
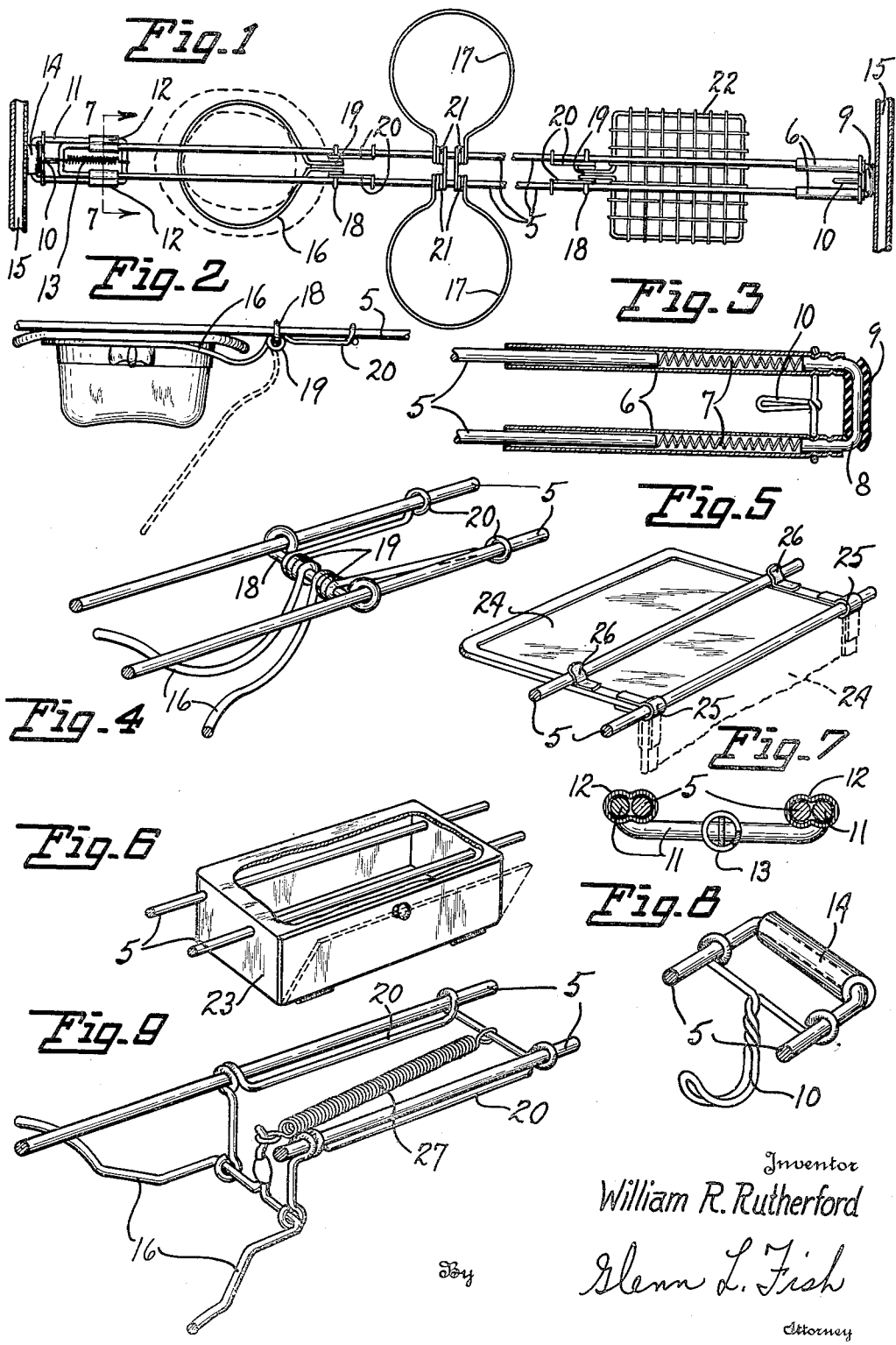
Inventor
William R. Rutherford
By Glenn L. Fish
Attorney Patented May 9, 1933

1,908,450

UNITED STATES PATENT OFFICE

WILLIAM R. RUTHERFORD, OF SPOKANE, WASHINGTON

AUTOMOBILE HAT AND PARCEL RACK

Application filed October 24, 1931. Serial No. 570,843.

My invention relates to automobile hat and parcel racks and certain objects of the invention are to provide a device of this character comprising a pair of parallel rods connected together in spaced apart relation and having expansive spring means on its ends whereby the rack may be jammed between the walls of an automobile. Further objects are to provide a plurality of supporting means, such as hat retainers, hooks, a parcel basket, a lock box and the like, that are slidably and adjustably disposed on said rods and some of which are normally held in a raised position against the rods by springs or other means.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a general plan view showing the device retained in position by the sides of a car body;

Fig. 2 is a fragmentary view in side elevation showing a hat retaining member and a hat held thereby;

Fig. 3 is a fragmentary view in horizontal section showing the retaining means for the device at one end thereof;

Fig. 4 is a fragmentary view in perspective showing a portion of a hat retaining member;

Fig. 5 is a detail view in perspective showing a glare eliminator screen adapted to be connected to the device;

Fig. 6 is a view in perspective of a parcel retaining box adapted to be connected to the device;

Fig. 7 is a view in transverse vertical section taken on a broken line 7—7 of Fig. 1;

Fig. 8 is a detail view in perspective of a hook slidably connected to the device for use as a coat hanger or the like; and Fig. 9 is a view in perspective showing a modified form of hat retainer adjustably mounted on the device.

Referring to the drawing throughout which like reference numerals indicate like parts, the numeral 5 designates a pair of rods disposed in spaced apart relation and joined at one of their ends to provide a single longitudinal U-shaped member. The open end portion of said rods is provided with a U-shaped tubular casing 6 whose hollow legs are provided with springs 7 and are adapted to receive the ends of the rods as clearly shown in Fig. 3 of the drawings. The connected end of said casing is made of a solid U-shaped piece of metal 8 which is provided with a rubber sleeve 9. As most clearly shown in Fig. 8, a hook 10 may be slidably mounted on said U-shaped piece and used for a coat hanger or the like.

The remote or closed end of the rods 5 has a rectangular frame member 11 disposed thereunder and slidably connected thereto by means of a pair of sleeves 12. A spring 13 is connected to said frame and to the closed ends of said rods and is normally under tension whereby said frame is forced outwardly. Thus both ends of said rods having means that are forced outwardly by springs, the device may be mounted in any suitable place within a car body and preferably adjacent the ceiling or top thereof. A rubber sleeve 14 is provided on the outer end of said frame and together with the rubber sleeve 9 on the opposite end of the rods prevents the device from slipping when same is jammed between the walls 15 of the car body as will be understood.

Hat retaining members or supports 16 and 17 are slidably mounted on the rods 5. Referring particularly to Figs. 2 and 4, the hat support 16 comprises an annular loop adapted to receive the crown of a hat. The end portions of said loop are brought together and coiled around a transverse member 18, as at 19, thus forming springs whereby said loop is normally retained upward against the rods. The ends of said transverse member are slidably looped around the rods and the extended end portions 20 of the annular loops are likewise looped around said rods. Thus said hat retaining member is slidable, as a whole, along said rods. When placing a hat therein, the loop portion is pulled down, as shown in dotted lines in Fig. 2. Said loop is released after placing the hat therein and the springs 19 cause same to press the brim of the hat against the rods thus securely holding the hat in place.

The hat retaining members 17 correspond somewhat with the members 16 and are made in pairs and disposed transversely of the rods 5. Said members are coiled around said rods, as at 21, to form springs and slidable means for said members. As shown in Fig. 1, a basket 22 is connected to said rods by the same slidable spring means employed in connecting the hat supporting member 16 thereto. As shown in Fig. 6, a lock box 23 may be slidably mounted on said rods. In Fig. 5 I have shown a glare eliminator 24 which may be pivotally connected to one of said rods, as at 25, and retained in the raised position against the other rod by clips 26. When lowered to the dotted position said glare eliminator protects the eyes from excessive glare of the sun or other light. In Fig. 9 of the drawing I have shown a modified form of hat retainer or support wherein a coiled spring 27 is used for normally retaining the loop member against the rods 5.

Having thus described my invention, it being understood that minor changes in its construction and arrangement may be resorted to without departing from the scope and spirit of the invention, what I claim and desire to secure by Letters Patent of the United States is:—

An automobile hat and parcel rack having in combination a pair of rods connected in spaced apart parallel relation, spring expansive means for both ends of said rods whereby the rack may be jammed between opposite walls of an automobile, retaining devices slidably mounted on said rods, and spring means for normally holding said devices in the raised position against the rods.

In testimony whereof I affix my signature.

WILLIAM R. RUTHERFORD.